United States Patent [19]

Sonderegger et al.

[11] Patent Number: 5,501,111

[45] Date of Patent: Mar. 26, 1996

[54] FORCE SENSOR SYSTEMS ESPECIALLY FOR DETERMINING DYNAMICALLY THE AXLE LOAD, SPEED, WHEELBASE AND GROSS WEIGHT OF VEHICLES

[75] Inventors: Hans C. Sonderegger; Reto Calderara; Claudio Cavalloni, all of Neftenbach, Switzerland

[73] Assignee: Kistler Instrumente AG, Winterthur, Switzerland

[21] Appl. No.: 264,062

[22] Filed: Jun. 22, 1994

Related U.S. Application Data

[63] Continuation-in-part of Ser. No. 114,700, Aug. 31, 1993, abandoned, which is a continuation of Ser. No. 995,831, Dec. 23, 1992, Pat. No. 5,265,481, which is a continuation of Ser. No. 810,039, Dec. 19, 1991, abandoned.

[30] Foreign Application Priority Data

Dec. 9, 1990 [CH]  Switzerland ............................ 04024/90

[51] Int. Cl.$^6$ ...................................................... G01L 1/04
[52] U.S. Cl. .................. 73/862.642; 73/DIG. 4; 29/25.35
[58] Field of Search ........................ 73/862.625, 862.642, 73/862.68, DIG. 4, 146.2, 146.3, 146.4, 146.5; 29/25.35

[56] References Cited

U.S. PATENT DOCUMENTS

| | | | |
|---|---|---|---|
| 3,239,696 | 3/1966 | Burkhalter et al. | 73/DIG. 4 X |
| 3,614,488 | 10/1971 | Sonderegger et al. | 73/DIG. 4 X |
| 4,059,999 | 11/1977 | Engeler et al. | 73/745 |
| 4,846,861 | 8/1987 | Morii | 73/DIG. 4 X |
| 5,072,611 | 12/1991 | Budd et al. | 73/118.1 |
| 5,214,967 | 6/1993 | Grogan | 73/862.642 X |
| 5,329,823 | 7/1994 | Sonderregger et al. | 73/862.642 |
| 5,337,461 | 8/1994 | Falcus | 29/25.35 |
| 5,345,428 | 9/1994 | Arnold et al. | 29/25.35 X |

*Primary Examiner*—Richard Chilcot
*Assistant Examiner*—Elizabeth L. Dougherty
*Attorney, Agent, or Firm*—Barnes & Thornburg

[57] ABSTRACT

The invention comprises a force measuring system and an assembly procedure for the dynamic determination especially of axle loads, speed, as well as for assembly of force and acceleration sensors. The force measuring system can be laid permanently in the roadway. It is of modular assembly, consisting of the amplifier, sensor and terminal module. The sensor module consists of a hollow section, in which piezo-elements are fitted under elastic preload. The hollow section is designed so that it can be opened elastically by lateral clamping, to allow mechanically interconnected piezo-elements to be inserted simply. After releasing this clamping, the piezo-elements are under high elastic preload. The same design principle can also be applied generally to force pressure and acceleration sensors. The elastical clamping force, vital for perfect force transmission to the piezo-elements, is for assembly purposes easily overcome by a proper lateral clamping force.

14 Claims, 2 Drawing Sheets

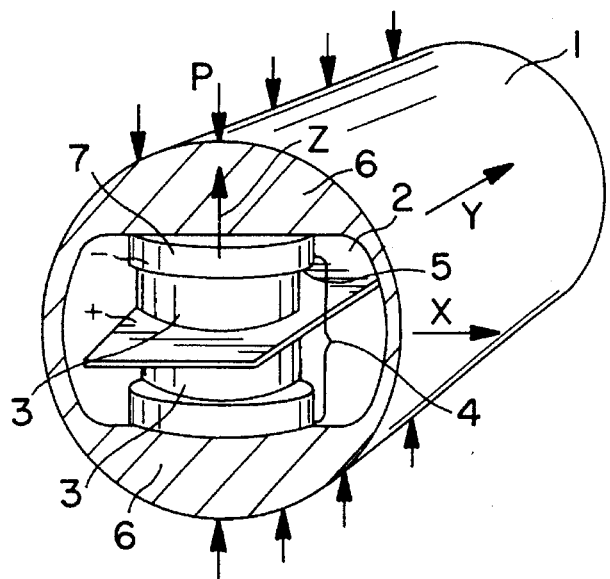
FIG. 1
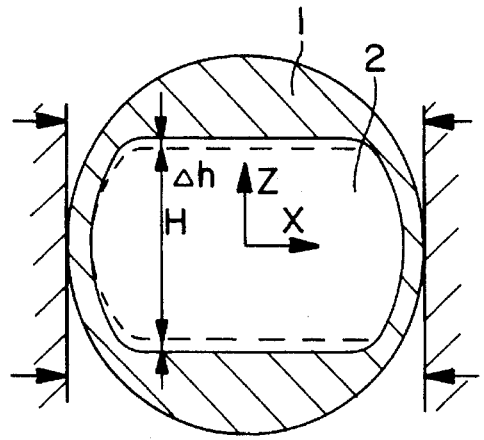
FIG. 2
FIG. 3a
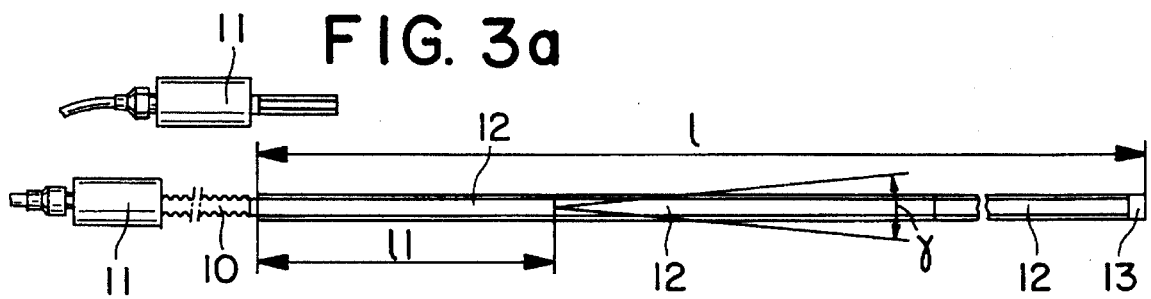
FIG. 3b
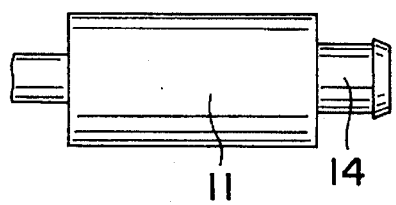
FIG. 4
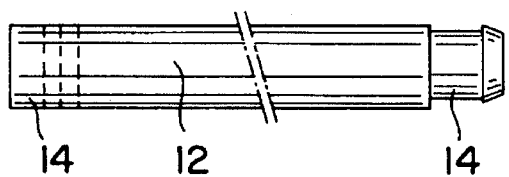
FIG. 5

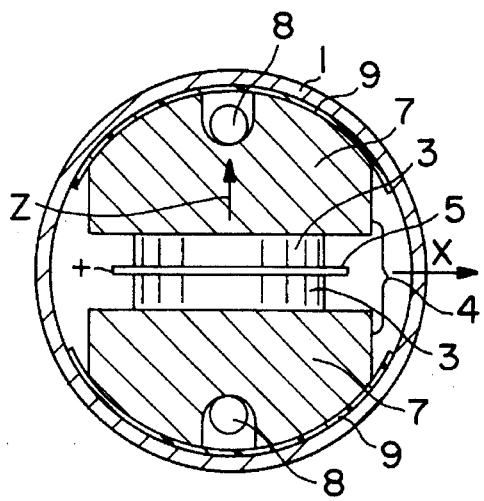
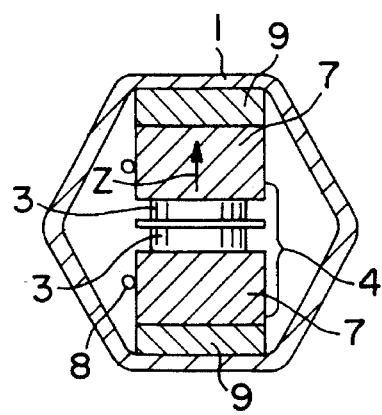
FIG. 6  FIG. 7
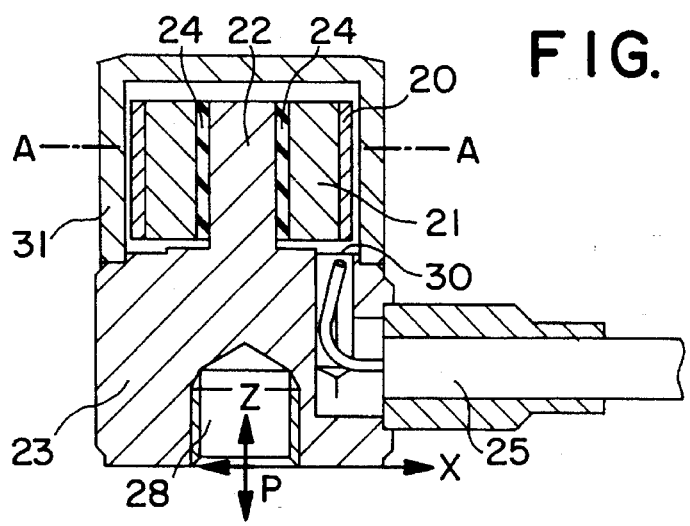
FIG. 8
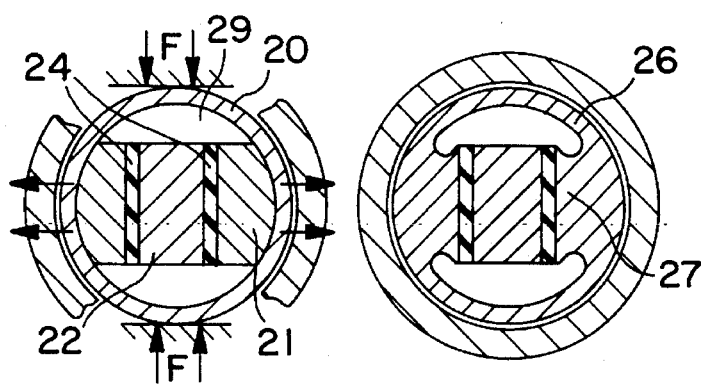
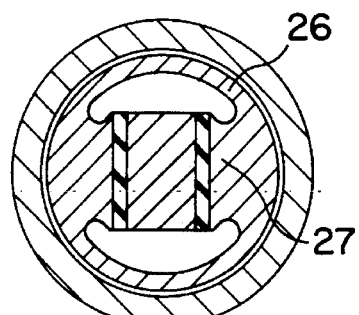
FIG. 9  FIG. 10

5,501,111

FORCE SENSOR SYSTEMS ESPECIALLY FOR DETERMINING DYNAMICALLY THE AXLE LOAD, SPEED, WHEELBASE AND GROSS WEIGHT OF VEHICLES

CROSS-REFERENCE

This is a continuation-in-part of Ser. No. 08/114,700, filed Aug. 31, 1993now abandoned, which is a continuation of 07/995,831, filed Dec. 23, 1992, now U.S. Pat. No. 5,265,481, which is a continuation of 07/810,039, filed Dec. 19, 1991, now abandoned.

BACKGROUND AND SUMMARY OF THE INVENTION

The invention relates to a force sensor system, especially for determining dynamically the axle load and speed, and to a circular clamp arrangement that allows simple assembly of force, pressure and acceleration sensors.

Familiar is the static weight measuring of vehicles by means of weighbridges, or with weighing devices placeable on the roadway surface and generally easily transportable. One example of these is Swiss Patent CH 597 595, which describes a weighing platform having a weighing plate resting on a base plate through hydraulic transducers. The pressure of the liquid compressed by the loading is measured. Weighing platforms operating with strain gauge elements are known also. Thus, the weighing platform described in U.S. Pat. No. 3,949,822 consists of a base plate flexible under load and a weighing plate, whereby the flexure is measured by means of strain gauges. Both weighing platforms are relatively thick and provided with ramps for driving up. Obviously they are suited only for static weighing of axle loads, or with the vehicle moving over very slowly.

In view of the growing vehicular traffic, however, a modern axle load determination must be capable of being performed dynamically, i.e., without the vehicle having to reduce its speed. Already attempts have been made to determine axle load and vehicle weight by means of so-called piezo-cables let into the top surfacing of a roadway. As signal elements, piezo-cables contain piezo-foils or piezo-compound. The measuring sensitivity of these depends very much on temperature.

A measuring arrangement with a piezo-cable laid in the top surfacing is prone to instability owing to the small force-absorbing surface and the compressibility of a plastic cable, which causes varying measuring sensitivity and other measuring inadequacies, such as instability of the measuring zero. Moreover, the measuring results of the axle load and vehicle weight are too inaccurate, mostly due to the often unsatisfactory insulation resistance of piezo-cables. The object of the present invention is to provide a force measuring system which overcomes the disadvantages named and enables dynamic determination of the axle load, speed, wheelbase and gross weight, employing advantageously two force sensor systems successively spaced at a short interval. In addition the invention shows a circular clamp system that can be used in other sensor systems.

The force sensor system must be suitable for any width of roadway and installable in simple fashion, for asphalt as for concrete roads.

The problem is solved by laying in the roadway a force sensor consisting of a hollow section in which a number of piezo-elements are fitted, giving a constant force measuring sensitivity over the entire length of the hollow section and arranged to allow electrical connection of the piezo-elements in series, group wise or individually, and so that simply layable modules result, consisting of amplifier, sensor and termination units.

The same hollow section is used generally on sensors for force, pressure and acceleration equipped with piezo-elements utilizing the shear effect.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross section through a force sensor according to the invention with cylindrical hollow section (tubular sensor).

FIG. 2 is an installation procedure by opening a hollow section of circular cross section by lateral clamping.

FIG. 3a is an amplifier module connected straight to the force sensor.

FIG. 3b is an amplifier module connected separately by corrugated tubing, linked with force sensor.

FIG. 4 is an amplifier module.

FIG. 5 is a sensor module with plug-and-socket connection.

FIG. 6 is a cross section through a tubular hollow profile with force-introducing parts insulated electrically from the tube.

FIG. 7 is a cross section through a hexagonal hollow section.

FIG. 8 is a cross section through an acceleration measuring sensor.

FIG. 9 is a cross section through a tubular hollow profile of FIG. 8.

FIG. 10 is a variant of a cross section of FIG. 8.

DESCRIPTION OF THE PREFERRED EMBODIMENTS

FIG. 1 shows a perspective view with cross section through a force sensor according to the invention with cylindrical hollow section (tubular sensor). The hollow section 1 contains a recess 2 in its longitudinal axis, into which a piezo-element 4 is press-fitted. A Piezo-element 4 consists of the force-introducing parts 7 and two piezo-discs 3. Between them is an electrically conductive foil 5 as signal carrier. The resulting piezo-element 4 is designed to be sensitive essentially to a force acting in the Z direction. This force P is introduced via a force-transmission section 6. As is explained later, the force sensor lies generally in the top surfacing of a roadway and the forces P originate from the weight of a vehicle passing over it. In the electrically conductive foil 5 they generate positive electrical charges for example, in the force-introducing parts 7 negative charges. The force-introducing parts 7 may take the shape of insulating ceramic or plastic strips passing through the entire hollow section, or individual parts.

However, it is also possible to make the force-introducing parts 7 of metal, and lead off the negative charges directly via a metal hollow section, as will be shown in FIG. 6.

The piezo-element 4 is mechanically preloaded. This preloading is obtained by pressing the hollow section 1 together laterally in the X direction during assembly, with pressing clamps, so that the recess 2 widens in the Z direction by the amount Δh (FIG. 2), after which the piezo-element 4 is guided into the recess 2. After removing the lateral pressure the widening disappears also, and with suitable dimensioning of the hollow section 1 and the recess 2 the piezo-element sustains an elastic preload (FIG. 2). As materials for the piezo-discs 3 both crystalline materials and piezoceramics or piezo-foils may be employed. The hollow section 1 may for example consist of a stainless steel tube with drawn inside profile, or of an extruded tube of aluminum alloy. It might just as well consist of a suitable plastic. An outside diameter of about 20 to 40 mm has proved efficacious for installation purpose. Also, the outside form of the hollow section 1 could be different from circular, for instance with flange sections.

FIG. 3a shows how the amplifier module 11 is attached directly to the force sensor of length L. FIG. 3b shows this connection in the form of a corrugated tubing cable 10. The force sensor of length L (which may be up to 20 m) is divided into separate pieces of length $L_1$ for manufacturing and installation reasons. These sensor modules 12 are preferably about 1 to 2 m long and can be plugged together, welded or glued. To match the force sensor to the roadway geometry it is advisable to provide the coupling elements with a certain elasticity, so that angle γ is about 1° to 3°. The last module is closed with end piece 13.

FIG. 4 shows a tubular-shaped amplifier module 11 with coupling piece 14 direct mounted.

FIG. 5 shows a sensor module 12 with positive and negative coupling pieces 14.

FIG. 6 shows a cross section through an embodiment of the force sensor according to the invention similar to that in FIG. 1. The principal difference from the embodiment in FIG. 1 is the commercially obtainable tube, in that the force is introduced through separate force-introducing parts 7, i.e., isolated from the hollow section 1 by an insulating layer 9. This makes it possible to keep both signal leads from the hollow section 1 separate, so that the measuring system is less susceptible to interference. The signals are led out on the one hand by the conductive foil 5, and on the other hand by the signal conductors 8, which are laid electrically conductive in grooves of the force-introducing parts 7. Mechanically to the embodiment of the force sensor shown in FIG. 2 constitutes a variant of FIG. 1, in that the hollow section 1 consists of a tube and can likewise be deformed elastically by lateral clamping in a special vice.

FIG. 7 shows a hollow section according to the invention, in the form of a hexagonal tube which can likewise be opened mechanically by clamping in the X direction. Other hollow sections are also conceivable.

FIG. 8 shows a cross-section of an accelerometer with similar tubular section for clamping and opening by lateral force of piezo-electric elements.

FIG. 9 shows the cross-section A—A through the acceleration sensor of FIG. 8. The tubular section 20 acts similar as in FIG. 6. The lateral force F opens the hollow section 29 in order to introduce the assembly consisting of force transmission post 22, piezo-discs 24 and clamp force transmission parts 21. After release of the lateral force F, the piezo assembly is in a solid compression position transmitting force P via force transmission post 22 to the piezo-discs 24 and to the clamp force transmission parts 21 which act as seismic masses. For measuring acceleration in the Z direction, the piezo-discs 24 must be sensitive in shear direction. For acceleration in X direction, they must be sensitive in compression. The signal contact 30 is conducted to the signal cable 25. It is state of the art to introduce an amplifier module into the sensor housing. After assembly, the sensor is closed by cap 31.

FIG. 10 shows the cross-section of a variant to FIG. 9 where the clamping ring section 26 and the clamping force transmission part 27 are made of one piece, for example, by injection molding whereby both parts together act as seismic mass. In order to increase the signal size it is possible to use a metal heavier than steel.

The invention describes a new system of piezo-electric sensors utilized for force measurements of automobile axles on road surfaces or for general force and acceleration sensors. The main principle is the requirement that in order to receive a solid state system no airgaps are allowed between force transmitting members and piezo-discs. The system thus must be set on a mechanical pretension. This is especially important for a utilization in accelerometers (FIG. 8) where the clamping force must be high enough to avoid any slippage when the instrument is accidentally dropped.

The system of a mechanical opening of the hollow sections 1, 29 by a lateral clamping force F allows a very simple and reliable assembly method for piezo-electric sensing systems allowing measurement of forces, pressures and accelerations.

We claim:

1. Force sensor system for dynamically determining vehicle axle load, speed, wheelbase and gross weight, comprising:

an elastically deformable sleeve having a longitudinal recess;

a number of piezo-elements located within the recess for obtaining a constant force measuring sensitivity over the whole length of the sleeve;

said piezo-elements being press-fitted by force-introducing parts in said recess between said sleeve and said piezo-elements so that the piezo-elements are under permanent elastic preload along a first axis transverse a longitudinal axis of said recess by elastic deformation of said sleeve.

2. The force sensor system according to claim 1, wherein the sleeve is a tube of circular cross section in which piezo-discs are fitted between force-introducing elements in said recess so that the piezo-discs are under permanent elastic preload.

3. The force sensor system according to claim 1, wherein the sleeve is a tube of non-circular cross section in which piezo-disks are fitted between force-introducing parts in said recess so that the piezo-discs are under permanent elastic preload.

4. A force acceleration sensor comprising:

a center post;

a pair of piezo discs separated by said post;

a pair of force-introducing parts separated by said piezo discs and said post; and an elastically deformable sleeve encompassing said post, piezo discs and force-introducing parts and elastically preloading said piezo discs by elastical deformation of said sleeve.

5. A sensor according to claim 4 wherein said post is fixed in and extends along a first axis of a sensor case and said sleeve preloads said piezo discs along a second axis transverse to said first axis.

6. A sensor system according to claim 5, wherein the piezo-discs are of rectangular shape and are sensitive in shear mode along said first axis.

7. A sensor according to claim 4, wherein between a signal contact and a signal cable an impedance converter/amplifier device is interconnected.

8. A sensor according to claim 4, wherein the piezo-discs are made of piezo ceramic.

9. A sensor according to claim 4, wherein the piezo-discs are made of a single crystal material.

10. A sensor according to claim 4 wherein said sleeve is an elastic metal.

11. A sensor according to claim 4 wherein said post extends along a first axis of said sleeve which forms a sensor case and said sleeve preloads said piezo discs along a second axis transverse to said first axis.

12. A method for assembling and preloading a force sensor comprising:

distorting a cross-sectional area of a sleeve to enlarge one cross-sectional length of a longitudinal recess in the sleeve;

inserting into the recess a piezo assembly having a pair of piezo discs separated by a center post and between a pair of force-introducing parts;

relaxing the distortion whereby the piezo discs are preloaded elastically so that any air gaps between the force-introducing parts, piezo discs and center post are removed.

13. A force sensor comprising:

a sensor case;

a center post unitary with said sensor case;

a pair of piezo discs separated by said post;

a pair of force-introducing parts separated by said piezo discs and said post; and an elastically deformable sleeve encompassing said post, piezo discs and force-introducing parts and elastically preloading said piezo discs.

14. A force sensor comprising:

a center post;

a pair of piezo discs separated by said post;

a pair of force-introducing parts separated by said piezo discs and said post; and an elastically deformable sleeve unitary with said force-introducing parts and encompassing said post, piezo discs and force-introducing parts and elastically preloading said piezo discs.

* * * * *